United States Patent [19]

Thomas et al.

[11] 3,832,559
[45] Aug. 27, 1974

[54] CASSETTE LOAD AND EJECT MECHANISM FOR SPOT-FILM APPARATUS

[75] Inventors: Eugene P. Thomas; Henry F. Cimildora; James A. Morin, all of Baltimore, Md.

[73] Assignee: CGR Medical Corporation, Baltimore, Md.

[22] Filed: Apr. 3, 1973

[21] Appl. No.: 347,429

[52] U.S. Cl. ............................. 250/468, 250/471
[51] Int. Cl. ........................................ G01n 21/34
[58] Field of Search .......... 250/468, 469, 470, 471; 221/99, 219

[56] References Cited
UNITED STATES PATENTS

| | | | |
|---|---|---|---|
| 2,817,766 | 12/1957 | Leishman | 250/471 |
| 3,173,008 | 3/1965 | Barrett | 250/468 |
| 3,173,010 | 3/1965 | Barrett | 250/471 |
| 3,173,011 | 3/1965 | Barrett | 250/471 |
| 3,521,061 | 7/1970 | Slagle | 250/471 |
| 3,524,059 | 8/1970 | Bartlet | 250/471 |
| 3,553,453 | 1/1971 | Hogan | 250/468 |

Primary Examiner—Archie R. Borchelt
Assistant Examiner—D. C. Nelms
Attorney, Agent, or Firm—Brady, O'Boyle & Gates

[57] ABSTRACT

A pair of friction wheel mechanisms adapted to engage the forward portion of respective sides of an X-ray film cassette and which uses the forward motion of the cassette tray as a driving force to eject the cassette automatically. A rack and pinion gear associated with each friction wheel are actuated by driver elements located on each side of the cassette tray. Each friction wheel and associated pinion gear rotate on a common axis and are integral with one another. The diameter of the friction wheel is selectively greater than the diameter of the pinion gear such that when the cassette tray drives the rack and pinion gear arrangement, the friction wheel will cause the linear velocity of the cassette to be greater than the linear velocity of the cassette tray by the ratio of the relative diameters of the pinion gears and friction wheel.

13 Claims, 13 Drawing Figures

PATENTED AUG 27 1974  3,832,559
SHEET 1 OF 3

CASSETTE LOAD AND EJECT MECHANISM FOR SPOT-FILM APPARATUS

BACKGROUND OF THE INVENTION

1. Field of the Invention

This invention relates to front loading spot-film devices and more particularly to means for loading and ejecting an X-ray film cassette in and out of a cassette tray contained in the spot-film device.

2. Description of the Prior Art

When the film in an X-ray cassette has been exposed, the cassette must be ejected from the cassette tray far enough to be grasped by the hand of an operator, but not so far that it will fall on the floor. A typical example of such apparatus is disclosed in U.S. Pat. No. 3,048,696 entitled "Spot Film Device" issued to H. E. Koerner, et al. Cassette ejection is usually accomplished by releasing some type of latch which allows a spring to push the cassette forward. Spring loading, however, is undesirable because it means that the cassette must initially be loaded against the force of a compressed spring which when released could cause undesirable results. This type of device is taught, for example, in U.S. Pat. No. 3,524,059 issued to J. S. Bartlett entitled "Front-Loading Spot-Filmer."

SUMMARY

The present invention is directed to an improved mechanism for loading and ejecting an X-ray film cassette to and from a front loading spot-filmer. The invention uses the motion of the cassette tray to drive a mechanism which ejects the cassette automatically, which mechanism also acts to draw the cassette into the tray when the cassette is manually inserted into the cassette loading aperture of the spot-filmer. Briefly, the subject invention comprises at least one but preferably a pair of friction wheels which are adapted to engage the forward portion of the cassette which when loaded in the soot filmer rests in a cassette tray. The cassette tray is further open on the front side edges allowing the friction wheels to selectively contact the cassette. Each friction wheel is driven by a respective rack and pinion during the ejection mode by an engaging driver element attached to the side of the cassette tray. The pinion gear and friction wheel are integral with one another and have different diameters with the diameter of the friction wheel being selectively greater than that of the pinion gear. Thus when the cassette tray is moved with the spot-film apparatus with a given linear velocity towards the loading aperture after exposure, the cassette is driven by the friction wheels at a greater velocity depending upon the ratio of the relative diameters. As the cassette tray comes to rest in the "load" position, the cassette comes to rest free of the tray and extending a few inches out of the front loading aperture in the spot-filmer where it can then be manually grasped.

DESCRIPTION OF THE PREFERRED EMBODIMENT

Figure 1:
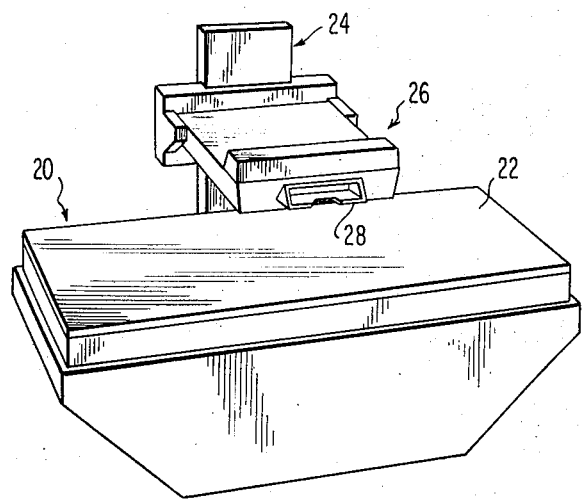
FIG. 1 is a perspective view of a medical X-ray table and a front loading spot-film device associated therewith.

Referring now to the drawings wherein the same reference numerals refer to the same elements in the various views, reference is first made to FIG. 1 which generally discloses the operating environment of the subject invention. Reference numeral 20 designates a medical X-ray table having an X-ray generator tube, not shown, located beneath the top 22 and being carried by a spot-film tower 24 which is adapted to move lengthwise along the side of the table. The spot-film tower 24 carries a spot-film device shown generally by reference numeral 26 and is movable reciprocally in a well known manner toward and away from the table top 22. The spot film device 26 comprises a front loading arrangement which is adapted for insertion or removal of an X-ray film cassette, not shown, via a loading aperture 28 in a relatively narrow front wall of the device when the X-ray table 22 is horizontal. Such front loading spot film devices possess certain advantages over prior spot film devices; however, a certain degree of care and effort is required on the part of the radiologist during loading and unloading of the X-ray film cassette through the loading aperture.

Figure 2:
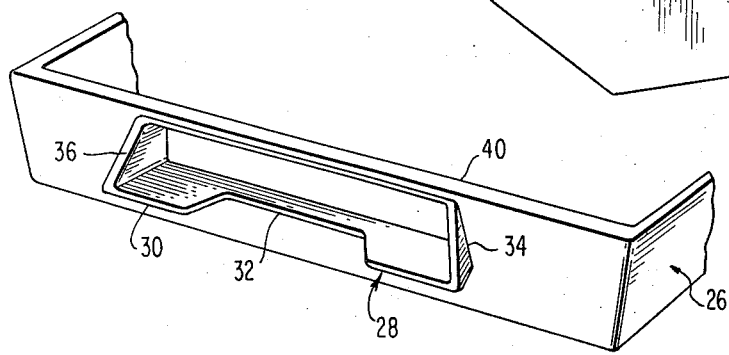
FIG. 2 is a partial perspective view of the loading aperture for the spot-film device shown in FIG. 1.

Referring now to FIG. 2, the aperture 28 of the subject apparatus is shown in greater detail and comprises a slightly downwardly extending lower projection 30 including a cutout portion 32 which facilitates the manual gripping of the cassette as it is being loaded into or out of the spot-film device. The aperture 28 also includes angulated side walls 34 and 36 which extend outwardly from one another for further facilitating loading. When an X-ray film cassette, not shown, is inserted through the aperture 28, it enters a cassette tray mounted on a spot-film carriage which automatically carries the cassette to one or more positions for exposures under the control of a programming mechanism included in the spot-film device.

Figure 3:
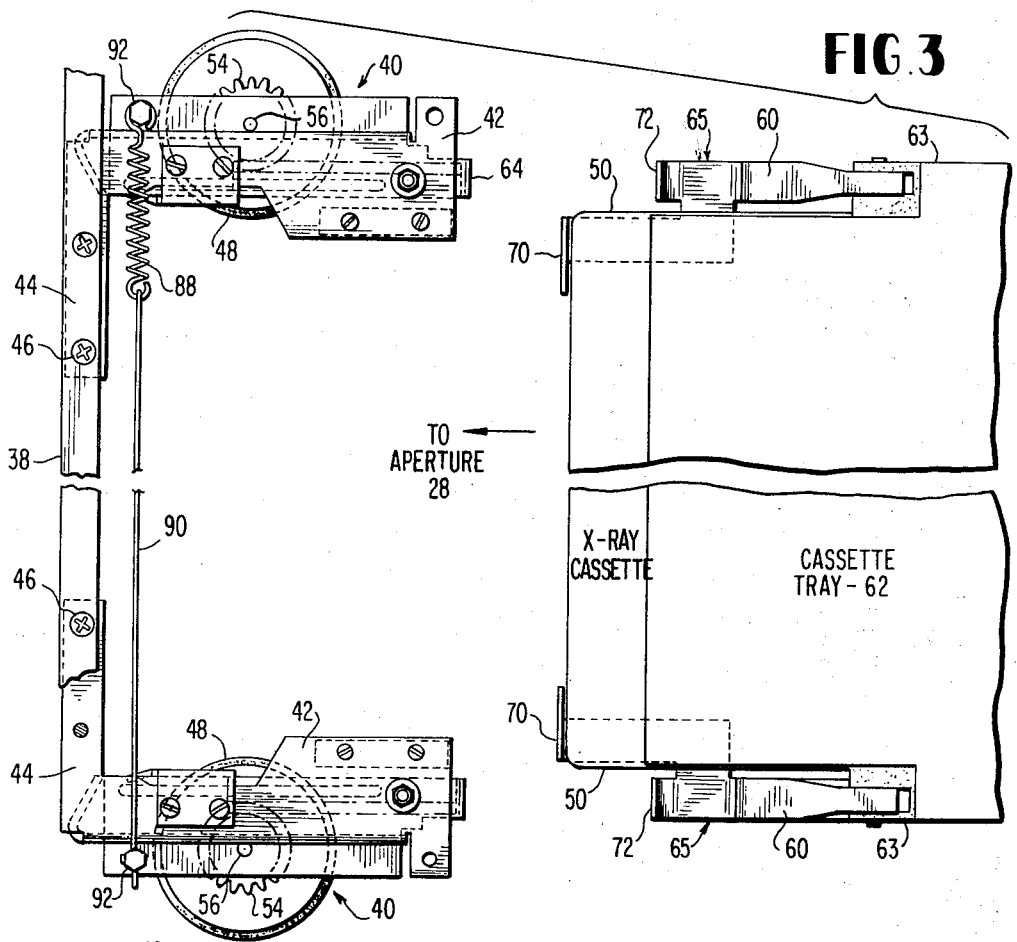
FIG. 3 is a partial plan view of an X-ray film cassette and cassette tray arrangement moving toward the spot-film cassette load and eject mechanism.
Figure 4:
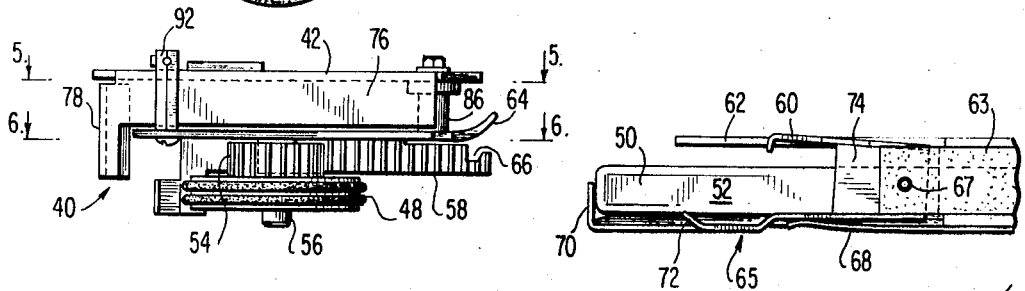
FIG. 4 is a partial side elevational view of the components shown in FIG. 3.

Referring now to the details of the subject invention, reference is now made to FIGS. 3 and 4 but more particularly to FIG. 3. Reference numeral 38 refers to a mounting bracket which is located behind the front wall 40 including the loading aperture 28. A pair of identical load and eject mechanism assemblies shown generally by reference numeral 40 are mounted on the bracket 38 by means of a mounting plate 42 having a angulated portion 44 fastened thereto by means of metal screws 46. The assemblies 40 are located immediately behind the aperture 28 on either side of the aperture side walls 34 and 36 and respectively include, inter alia, a friction wheel 48 mounted substantially parallel to the plane of the spot-film device intermediate the short dimension of the aperture, and being adapted to contact a portion of the relatively narrow side walls 50 of an X-ray film cassette 52. Integral with the friction wheel 48 is a pinion gear 54. Both elements 48 and 54 are rotatable about a common shaft 56 located on the mounting plate 42. A gear rack 58 (FIG. 4) meshes with the pinion gear 54 and is adapted to be driven linearly back and forth by means of a finger like driver element 60 associated with a cassette tray 62 containing the cassette 50 and located at the sides thereof. Although operational details will follow subsequently, it should be pointed out that the forward movement of the cassette tray 62 from the "park" position to the "load" position in proximity to the load and eject mechanism assemblies 40 causes the driver elements 60 to respectively abut a striker plate 64 shown projecting upwardly in FIG. 4, forcing the driver 60 into a notch 66 in the rack 58. As forward travel of the cassette tray 62 continues toward the apertures 28, the driver element 60 drives the rack 58 forward turning the friction wheel 48 by means of the integral pinion gear 54.

The cassette tray 62 in addition to being open at the front thereof for receiving a cassette is slotted on the forward portion of its side walls 63 as shown in FIG. 4 leaving the side walls 50 of the cassette 52 exposed for contact with the friction wheels 48 as the cassette tray 62 moves forward to the loading position. In addition to the notched side wall portions of the cassette tray 62, the driver element 60 which acts as the driver for the gear rack 58 is part of a sheet metal member 65 which is pivotally attached to the tray side wall 63 by means of a pin 67. The member 64 is spring biased upwardly by means of a spring tab 68 shown in FIG. 4 extending from the bottom of the cassette tray 62. The lower portion of the sheet metal member 65 comprises a latching member 70 which is adapted to contact the forward edge of the X-ray cassette 52 from beneath. The sheet metal member 65 additionally includes an upwardly angulated tab 72 for contacting switch means, not shown, when the cassette tray is in the load position for actuating a signal light or the like. Finally, the sheet metal member 65 includes a rib section 74 (FIG. 4) for providing certain rigidity of the driver element 60 as well as providing required mechanical strength.

Figure 5:
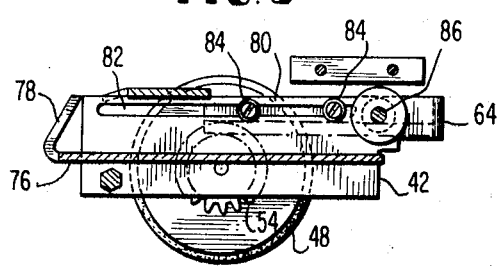
FIG. 5 is a sectional view taken along lines 5—5 of the load and eject mechanism shown in FIG. 4.
Figure 6:
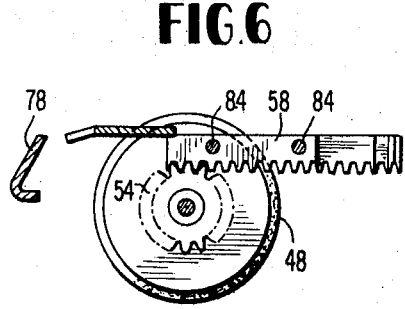
FIG. 6 is a sectional view of the load and eject mechanism shown in FIG. 4 taken along the lines 6—6.

Considering the other mechanical details of the load and eject mechanisms 40, reference is now made to FIGS. 5 and 6. FIG. 5, which is a plan sectional view taken along lines 5—5 of FIG. 4, the mounting plate 42 includes a downwardly extending wall member 76 having an angulated forward portion 78 which is bent inwardly toward the aperture 28 shown in FIG. 2. FIG. 5 additionally discloses the details of the striker plate 64 which additionally includes a longitudinally forward extending body portion 80 having a guide slot 82 for restricting the travel of the gear rack 58 as well as maintaining the driver element 60 in the notch 66. Referring to FIG. 6, the gear rack 58 includes a pair of guide posts 84 which extend up through the slot 82 shown in FIG. 5. Thus the gear rack 58 is adapted to move back and forth engaging the pinion gear 54 thereby turning the friction wheel 48. It should be pointed out that the forwardmost travel of the gear rack 58 meets the angulated forward portion 78 which causes the entire assembly 40 shown in FIGS. 3 and 4 to rotate outwardly about the pivot post 86. This rotation is normally restrained, however, by means of the tension spring 88 and the wire 90 connected between the posts 92 as shown in FIG. 3.

It should also be pointed out before discussing the operation of the subject invention any further that the relative diameter of the pinion gear 54 and the friction wheel 48 are selectively chosen such that the diameter of the friction wheel is preferably twice that of the pinion gear. Thus as the pinion gear 54 is turned about its shaft 56, the magnitude of the peripheral velocity V at the outer perimeter thereof will be accompanied by a corresponding magnitude of peripheral velocity 2V at the outer perimeter of the friction wheel 48. Also the distance $d = V \times$ time of travel vary by the same ratio. It is this principle of mechanical advantage which underlies the concept of the subject invention.

Figure 7:
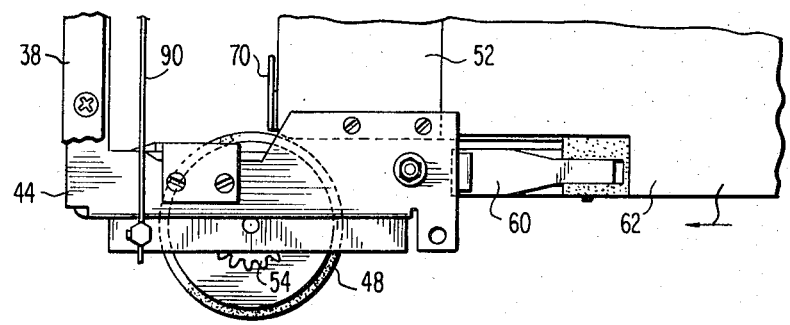
FIG. 7 is a partial plan view of the arrangement shown in FIG. 3 illustrating the operation of the load and eject mechanism.
Figure 8:
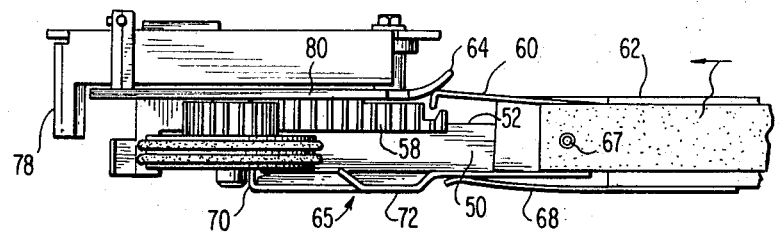
FIG. 8 is a side elevational view of the apparatus shown in FIG. 7 being further illustrative of the relative position of elements.

Referring now to FIGS. 7 through 13 for an understanding of the operation of the subject invention, attention is first directed to FIGS. 7 and 8 which disclose in plan and side elevational views, respectively, the beginning of the ejection or unloading sequence wherein the cassette tray 62 with the X-ray cassette 52 located therein approaches the friction wheel 48 while moving forward towards the loading aperture 28 shown in FIG. 2. As the tip of the side walls 50 of the X-ray cassette 52 meets the respective friction wheel 48, the driver element 60 on cassette tray 62 abuts the striker plate 60. At this point, the sheet metal element 65 which comprises not only the driver element 60, but also the cassette latch 70 is still being urged upwardly by means of the spring element 68 so that the latch 70 holds the cassette 52 firmly in its seated arrangement within the cassette tray.

Figure 9:
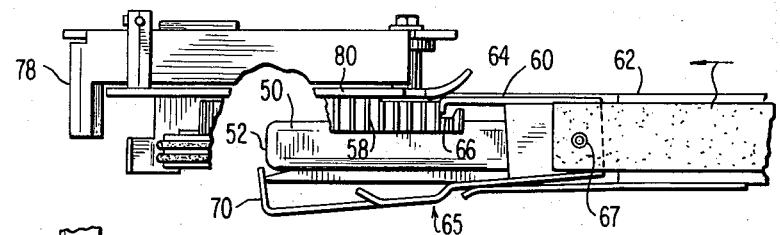
FIG. 9 is a cutaway side elevational view further illustrative of the load and eject mechanism, being illustrative of the cassette latching mechanism and its operation.

Referring now to FIG. 9 wherein further advancement of the cassette tray 62 has taken place, the driver element 60 has been forced downwardly into the notch 66 in the gear rack 58 by means of the action of the striker plate 64. The cassette tray 62 is now in engagement with the gear rack 58 such that any further forward movement of the cassette tray 62 will cause a corresponding forward linear translation of the gear rack 58. FIG. 9 additionally points out that the downward push of the driver element 60 by means of the striker 64 is also accompanied by a downward swing of the cassette latch 70 since the sheet metal member 65 as a whole rotates about the pivot pin 67. Thus the cassette 52 is now free to be removed from the cassette tray. Continued forward movement of the cassette tray 62 causes the driver element 60 to ride under the body portion 80 of the striker plate 64.

Figure 10:
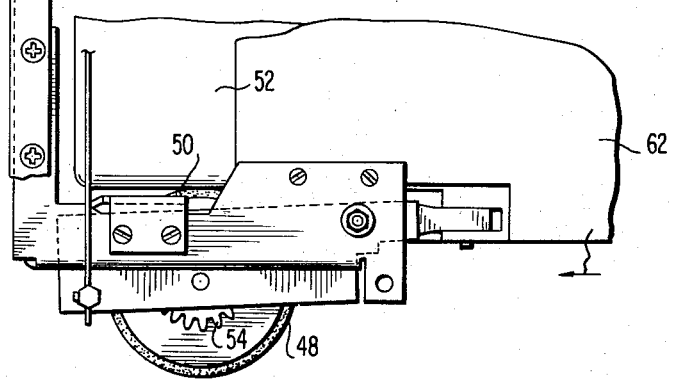
FIG. 10 is a partial plan view of the load and eject mechanism, being illustrative of the cassette and cassette tray approaching the load position.
Figure 11:
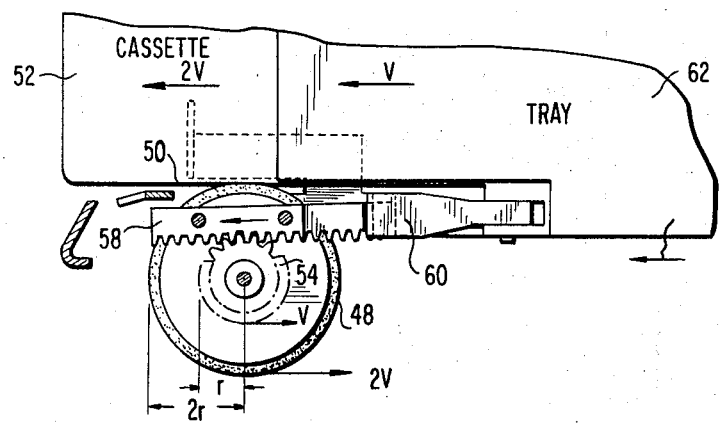
FIG. 11 is a cutaway plan view further illustrative of the load eject mechanism as the cassette tray approaches the load position.

FIGS. 10 and 11 disclose a still further forward movement of the cassette tray 62 whereupon the friction wheel 48 engages the side 50 of the cassette 52. Since the cassette is now free to move independently of the tray 62 due to the disengagement of the latch 70 as shown in FIG. 9, the forward movement of the gear rack 58 caused by a push of the driver member 60 as shown in FIG. 11, causes the pinion gear 54 to rotate. Since the friction wheel 48 is integral with the pinion gear 54, it will rotate also. Since the relative diameters of the friction wheel 48 and the pinion gear 54 are different, preferably in the order of 2 to 1, the magnitude of the peripheral velocity and distance also increases by the same factor. Thus for example a quarter turn of the pinion gear 54 is also accompanied by a quarter turn of the friction wheel 48; however, the friction wheel 48 will have caused the forward distance traveled by the cassette 52 to be twice the corresponding forward travel of the cassette tray 62, thereby causing ejectment of the cassette from the tray 62.

Figure 12:
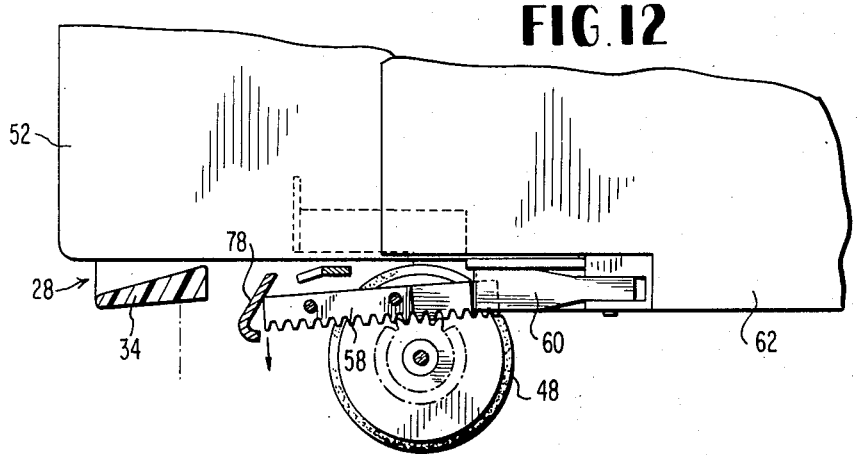
FIG. 12 is a partial plan view of the load eject mechanism being illustrative of its operation at the load position.
Figure 13:
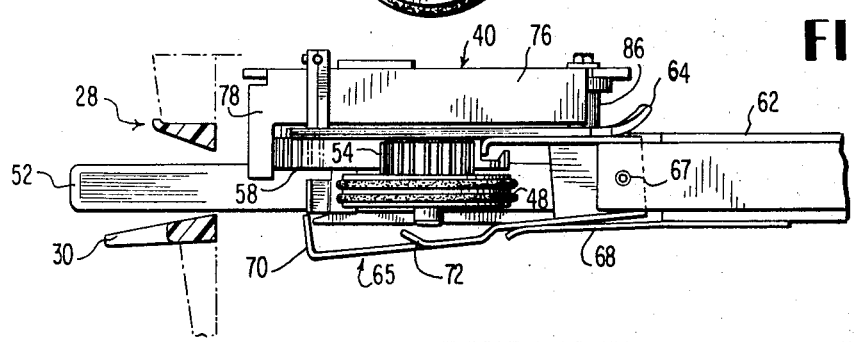
FIG. 13 is a side elevational view of the arrangement shown in FIG. 12, being further illustrative of the operation of the load and eject mechanism at the load position.

FIGS. 12 and 13 illustrate the most forward or "load" position of the cassette tray 62, at which position the friction wheel 48 has moved the cassette partly out of the cassette tray and into the aperture 28 where it can be removed by hand. What is significant, however, is that the driver element 60 has urged the gear rack 58 against the inner surface of the inclined forward edge 78 of the member 76. This abutment causes the mechanism 40 to rotate outwardly about the pivot post 86 shown in FIG. 13 causing the friction wheel 48 to lose contact with the side wall of the cassette 52 as shown in FIG. 12. The cassette 52 is thus completely free for removal from the aperture 28.

Loading is the reverse of the ejection process. The cassette 52 is placed in the tray 62 through the aperture 28 and as it reaches the rear of the tray, the tray begins a rearward movement toward the "park" position, causing the gear rack 58 to move also. This causes the drivers 48 to pull in and contact the side 50 of the cassette, pulling the cassette into the tray, due to the diameter ratio of the friction wheel 48 and the pinion gear 54. As the cassette 52 bottoms and the driver element 60 disengages the gear rack 58, the latching member 70 secures it in the tray until the next eject sequence.

Thus what has been shown and described is a mechanism which uses the linear motion of the cassette tray to load and eject X-ray film cassettes from the tray in a front loading spot film device. Although the invention has been described with a certain degree of particularity, it is understood that the present disclosure has been made by way of example only, and is not meant to be interpreted in a limiting sense, since it should be readily apparent to those skilled in the art that various changes in the form and arrangement of parts can be made to suit specific requirements without departing from the spirit and scope of the invention as hereinafter claimed.

We claim as our invention:

1. Cassette load and eject apparatus for a front loading spot-film device having a cassette loading aperture in the front wall thereof, comprising in combination:
an open ended cassette tray movable to and from a cassette loading position in proximity to said loading aperture, said tray having a pair of side walls with a selected portion of at least one side wall removed at the open end for exposing a portion of a cassette side wall when an X-ray film cassette is located therein, and a driver element located adjacent said at least one side wall and extending toward said open end; and
a mechanism including a friction wheel of predetermined diameter rotatably mounted adjacent said loading aperture and being oriented to peripherally contact the exposed side wall portion of said cassette to move said cassette selectively in and out of said tray and loading aperture, and gear means being driven by said driver element in response to the movement of said cassette tray and being coupled to said friction wheel, causing rotation of said friction wheel as said tray is moved to and from said loading aperture.

2. The apparatus as defined by claim 1 wherein said gear means comprises a gear train.

3. The apparatus as defined by claim 2 wherein said gear train includes a spur gear of predetermined diameter integral with said friction wheel.

4. The apparatus as defined by claim 3 wherein the diameter of said friction wheel is greater than the diameter of said spur gear.

5. The apparatus as defined by claim 1 and wherein said gear means comprises a rack and pinion gear assembly, said rack being driven by said driver element and said pinion gear having a diameter relatively smaller than said friction wheel and adapted to turn said friction wheel.

6. The apparatus as defined by claim 5 wherein said pinion gear is integral with said friction wheel and said rack includes engagement means located at one end thereof adapted for engagement with said driver element as said cassette tray moves to said loading position.

7. The apparatus as defined by claim 1 wherein said mechanism additionally includes means for moving said friction wheel away from the exposed side wall portion of said cassette at said loading position, to thereby facilitate removal of said cassette from said tray.

8. The apparatus as defined by claim 1 wherein said tray has a selected portion of the other side wall removed for exposing a corresponding portion of the other side wall of said cassette and a second driver element located adjacent said other side wall;
a second mechanism, like said first recited mechanism and mounted opposite thereto in said spot-film device, being adjacent said loading aperture and including a respective friction wheel of predetermined diameter oriented to peripherally contact the other exposed side wall portion of said cassette and second gear means being driven by said second driver element by the movement of said cassette tray and being coupled to said last recited friction wheel, causing rotation thereof as said cassette tray moves to and from said loading aperture.

9. The apparatus as defined by claim 8 wherein the diameters of both respective friction wheels are equal.

10. The apparatus as defined by claim 8 and additionally including means for simultaneously moving both said friction wheels out of contact with said cassette when said cassette tray is at said loading aperture.

11. The apparatus as defined by claim 8 wherein said first and second recited gear means comprises first and second rack and pinion gear assemblies, each pinion gear being adapted to rotate a respective friction wheel and each rack being driven by a respective driver element.

12. The apparatus as defined by claim 11 wherein the pinion gears are concentrically integral with respective friction wheels and are of an equal relatively smaller diameter than the diameter of the friction wheels.

13. The apparatus as defined by claim 11 wherein the ratio of the diameter of the friction wheels to the diameter of the pinion gears is greater than unity.

* * * * *